United States Patent
Takeo

(10) Patent No.: US 7,848,041 B2
(45) Date of Patent: Dec. 7, 2010

(54) METHOD AND APPARATUS FOR CORRECTING DATA ERRORS IN A DISK DRIVE

(75) Inventor: Akihiko Takeo, Tachikawa (JP)

(73) Assignee: Kanushiki Kaisha Toshiba, Tokyo (JP)

( * ) Notice: Subject to any disclaimer, the term of this patent is extended or adjusted under 35 U.S.C. 154(b) by 328 days.

(21) Appl. No.: 12/103,922

(22) Filed: Apr. 16, 2008

(65) Prior Publication Data

US 2008/0297936 A1    Dec. 4, 2008

(30) Foreign Application Priority Data

May 31, 2007    (JP) .............................. 2007-145911

(51) Int. Cl.
*G11B 5/09* (2006.01)
(52) U.S. Cl. .......................................... 360/53; 360/51
(58) Field of Classification Search .................. 360/31, 360/53
See application file for complete search history.

(56) References Cited

U.S. PATENT DOCUMENTS

| 5,956,216 | A | 9/1999 | Chou | |
|---|---|---|---|---|
| 7,667,912 | B2 * | 2/2010 | Goldberg et al. | 360/53 |
| 2009/0002868 | A1 * | 1/2009 | Mallary et al. | 360/55 |
| 2009/0003144 | A1 * | 1/2009 | Mallary et al. | 369/30.21 |
| 2009/0086356 | A1 * | 4/2009 | Kuznetsov et al. | 360/53 |

FOREIGN PATENT DOCUMENTS

| JP | 2000-156048 | 6/2000 |
|---|---|---|
| JP | 2001-189059 | 7/2001 |
| JP | 2003-281701 | 10/2003 |
| JP | 2005-252973 | 9/2005 |

* cited by examiner

*Primary Examiner*—Daniell L Negrón
*Assistant Examiner*—Regina N Holder
(74) *Attorney, Agent, or Firm*—Pillsbury Winthrop Shaw Pittman, LLP

(57) ABSTRACT

According to one embodiment, a disk drive that includes a disk and a disk controller is provided which effectively correct data errors that are generated at the time of reproducing data. The disk has a data-recording area constituted by a set of magnetic dots that are physically separated from one another. The disk controller uses error-correcting codes to determine an error that shows a change in the total number of bits in a data-bit string of the data set reproduced.

13 Claims, 7 Drawing Sheets

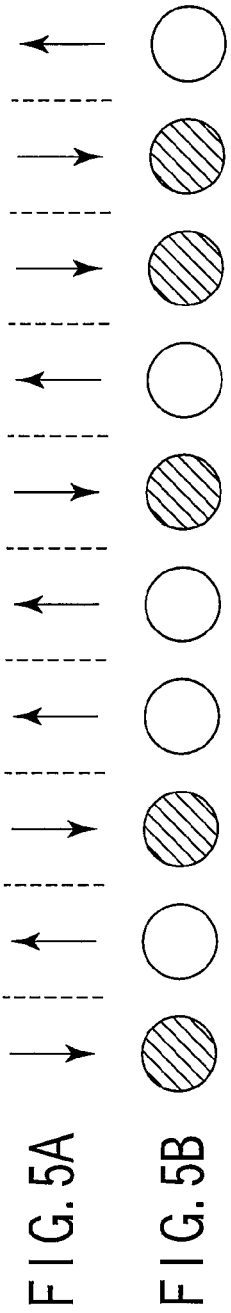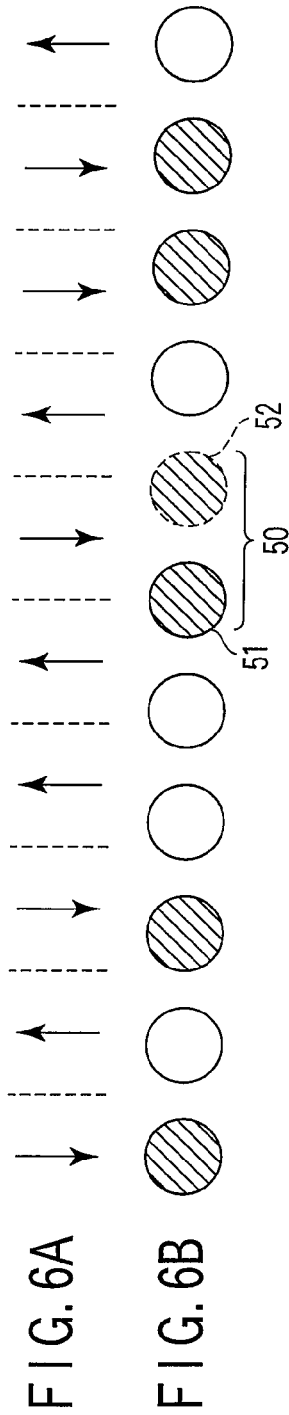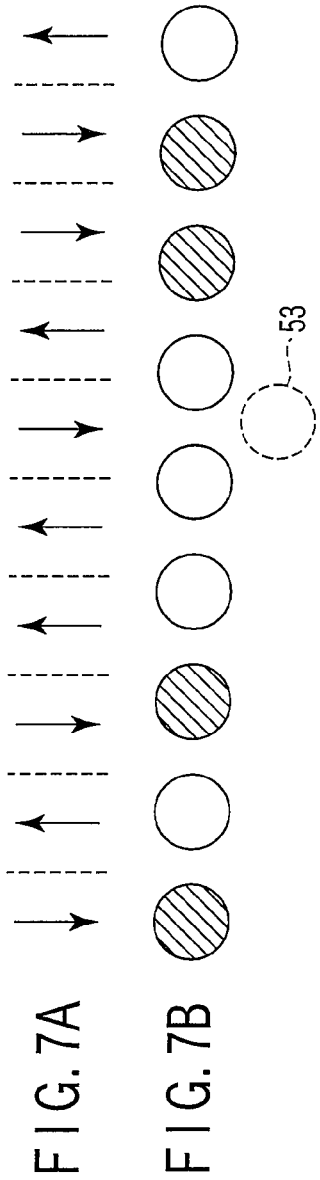

Add "0" error bit

Lose "0" bit
"11" => "0"

METHOD AND APPARATUS FOR CORRECTING DATA ERRORS IN A DISK DRIVE

CROSS-REFERENCE TO RELATED APPLICATIONS

This application is based upon and claims the benefit of priority from Japanese Patent Application No. 2007-145911, filed May 31, 2007, the entire contents of which are incorporated herein by reference.

BACKGROUND

1. Field

One embodiment of the present invention relates to a disk drive able to correct errors in the data recorded in the data-recording area of a disk.

2. Description of the Related Art

In recent years, discrete track media (DTM) disks and patterned media disks such as bit-pattern media (BPM) disks have been attracting attention in the field of disk drives, typically hard disk drives. (See, for example, U.S. Pat. No. 5,956, 216.) BPM disks are magnetic disks in which the bits in each track are physically separated from one another.

An ordinary magnetic disk has surface regions made entirely of magnetic material. Hence, data is magnetically recorded on either surface, as a head applies a recording magnetic field to the surface. On the other hand, in the surface of any BPM disk, magnetic dots (processed magnetic dots), which correspond to the bits that constitute the recorded data, are formed, defining a magnetic-dot pattern. Note that the magnetic dots are physically separated from one another and are thus independent of one another.

Any disk drive incorporating a BPM disk allocates one or more magnetic dots to one bit (0 or 1) of the recorded data, thereby magnetically recording the data on the BPM disk. Such a disk drive can enhance the magnetic stability of each bit of data recorded on the disk. This may accomplish high-density data recording, as is expected in this field of the art.

In the disk drive incorporating a BPM disk, however, the head must be accurately positioned relative to the coordinates of each magnetic dot physically processed, at the timing of applying the recording magnetic field. Various methods of controlling the timing of recording have been proposed. (See, for example, Jpn. Pat. Appln. KOKAI Publication No. 2003-281701.)

However, it is difficult to control the timing as desired for all data to be recorded on the disk. If data errors are made because of insufficient timing control, a technique of correcting data errors before reproducing the data from the disk will be important.

The ordinary method performed in conventional disk drives is to record data that includes data to which error-correcting codes (ECCs), such as parity codes, are added, and to correct the errors by using the parity codes at the time of reading the data. (See, for example, Jpn. Pat. Appln. KOKAI Publication No. 2005-252973.)

The conventional method of correcting data errors corrects data-bit errors, i.e., 0s or 1s recorded at the specific data locations in the data-recording area of the disk. This method facilitates the decision of whether the signals at specific data locations are 0s or 1s, if the decision cannot be made otherwise. In brief, the conventional method of correcting data errors is based on the assumption that the total number of data bits that constituting data recorded in a data sector, i.e., one access unit of data, remains unchanged even if this data contains errors.

In any disk drive that incorporates a BPM disk, however, the data error is generated by a great error of controlling the recording timing. The data error inevitably increases or decreases the total number of data bits from the proper value. Hence, the conventional method of correcting data errors cannot be employed if the total number of data bits changes so.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 5A and 5B are diagrams that represent the relation between magnetic bits have with data bits in the embodiment of FIG. 1;

FIGS. 6A and 6B are diagrams that explain how excessive bits are generated when a data error occurs in the embodiment of FIG. 1;

FIGS. 7A and 7B are diagrams that explain how bits are erased when a data error occurs in the embodiment of FIG. 1;

DETAILED DESCRIPTION

Various embodiments according to the invention will be described hereinafter with reference to the accompanying drawings. In general, according to one embodiment of the invention, there is provided a disk drive in which data errors, i.e., changes in the total number of data bits at the time of reproducing the data, can be effectively corrected.

(Configuration of the Disk Drive)

Figure 1:
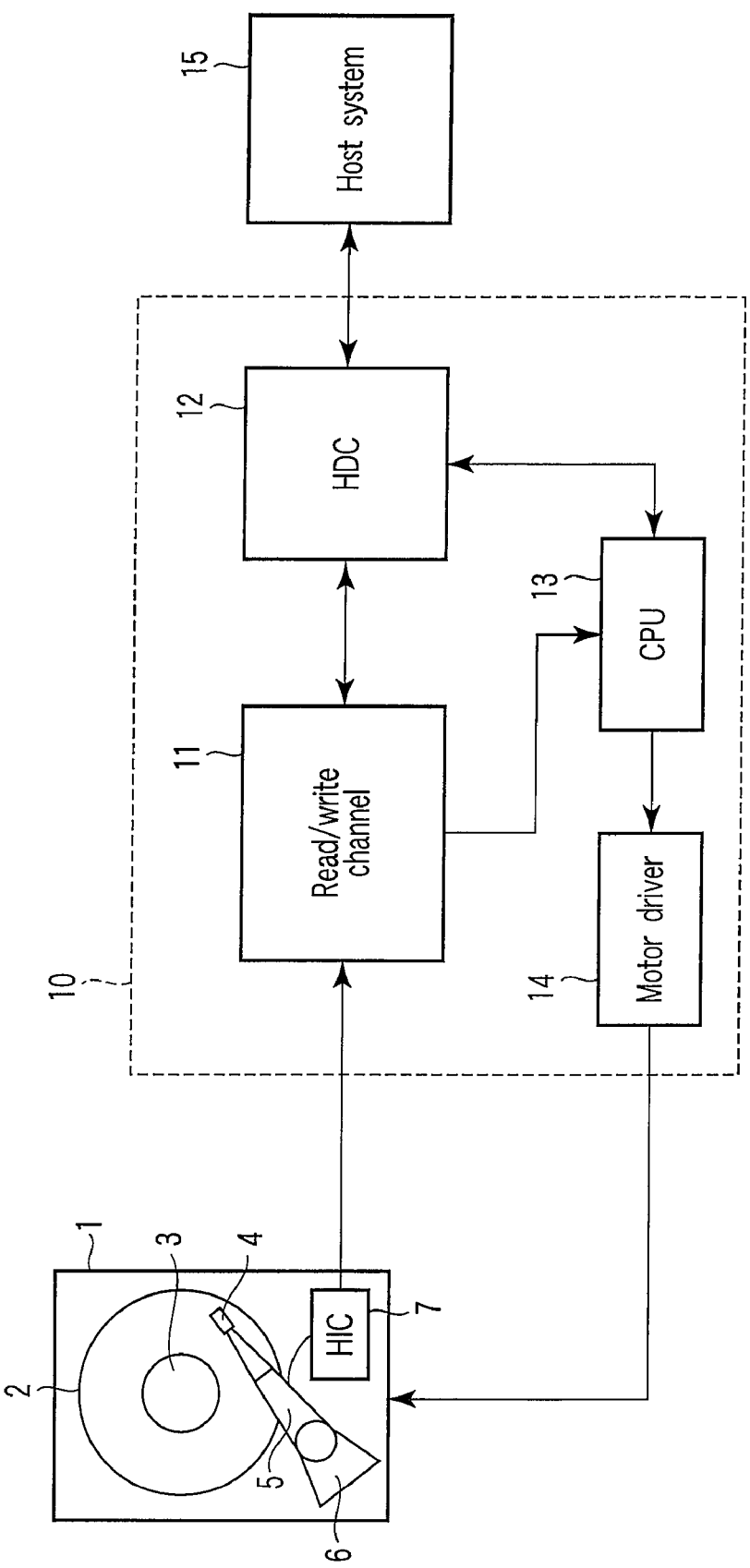
FIG. 1 is a block diagram showing the major components of a disk drive according to an embodiment of the present invention.
Figure 2:
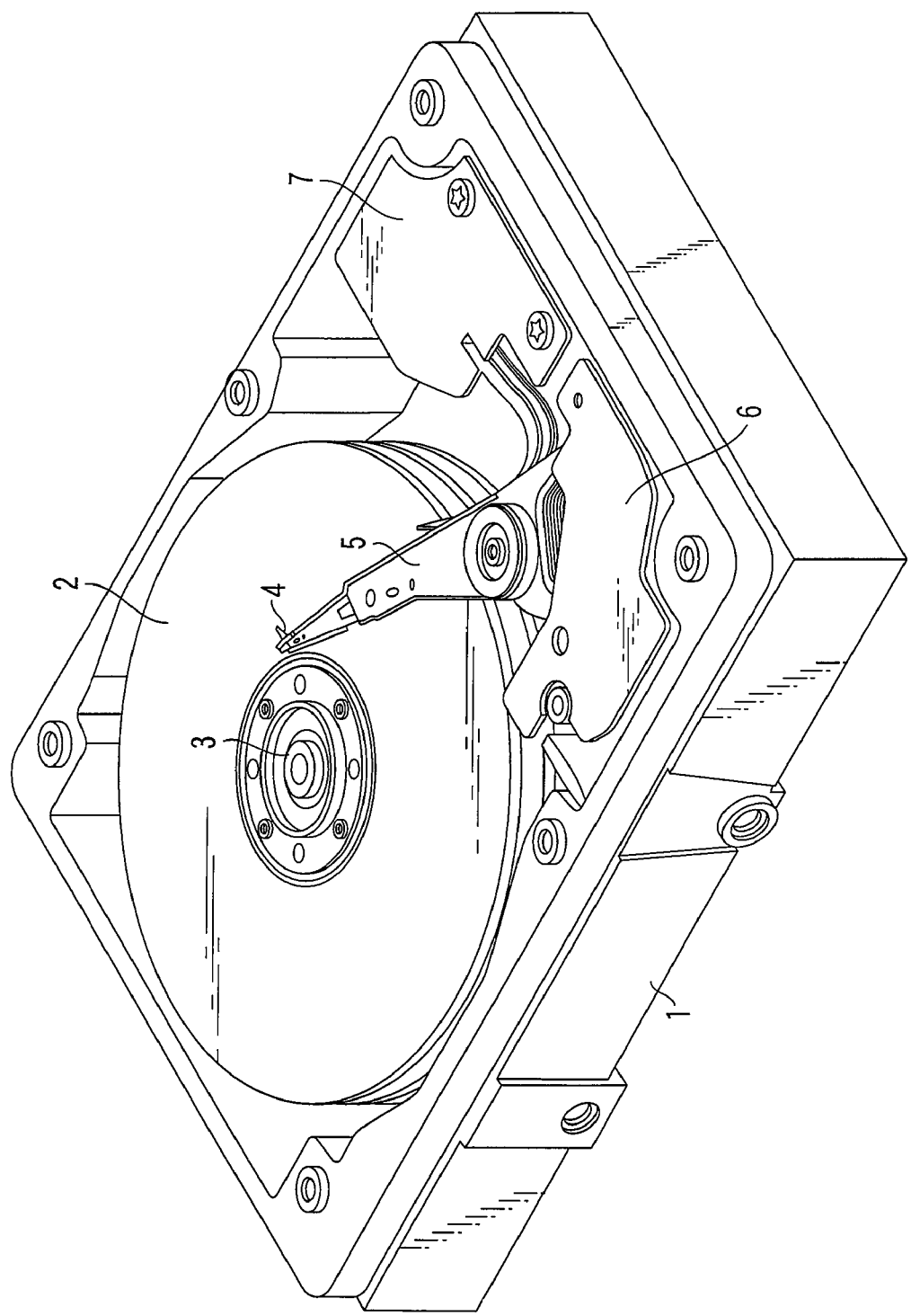
FIG. 2 is a perspective view of the disk drive according to the embodiment.

According to an embodiment, FIG. 1 shows a block diagram showing the major components of a disk drive. FIG. 2 is a perspective view of the disk drive.

As FIG. 2 shows, the disk drive has a housing 1, a disk 2, a spindle motor 3, a head 4, and an actuator 5. In the housing 1, the disk 2 is turned by the spindle motor (SPM) 3, and the head 4 is mounted on the actuator 5. The disk 2 is a magnetic recording medium of BPM structure (or patterned-media structure).

The actuator 5 comprises a suspension and an arm, which support the head 4. Driven by a voice coil motor (VCM) 6, the actuator 5 rotationally moves the head 4 to a target position over the disk 2, thus positioning the head 4. The head 4 is a slider on which a read element and a write element are mounted, spaced apart from each other. The read element is configured to read data from the disk 2, and the write element is configured to write data in the disk 2. The head 4 is connected to a head amplifier 7 by a flexible printed-circuit (FPC) board (not shown).

As FIG. 1 shows, the disk drive further has a circuit board 10 at the back of the housing 1. On the board 10, a read/write channel 11, a disk controller (HDC) 12, a microprocessor (CPU) 13 and a motor driver 14 are mounted.

The read/write channel 11 is a signal-processing unit. It processes a read signal output from the head amplifier 7 and reproduces (decodes) the servo data or user data recorded on the disk 2. The read/write channel 11 receives write data from the disk controller 12 and encodes the same, generating a write signal. The write signal is output to the head amplifier 7. The head amplifier 7 converts the write signal to a current, which is supplied to the write element that is incorporated in the head 4.

The disk controller 12 is an interface that controls the transfer of the read/write data between the disk drive and a host system 15. The disk controller 12 has a unit that performs data-error correction according to this embodiment and also the ordinary error correction.

The CPU 13 is main controller of the disk drive. It performs the positioning of the head 4, in accordance with the servo data the head 4 has read from the disk 2. More specifically, the CPU 13 controls the VCM driver incorporated in the motor driver 14, ultimately controlling the VCM 6. The positioning of the head 4 is thereby achieved. The motor driver 14 includes a SPM driver in addition to the VCM driver. The SPM driver is designed to control the SPM 3.

(Structure of the Disk)

Figure 3:
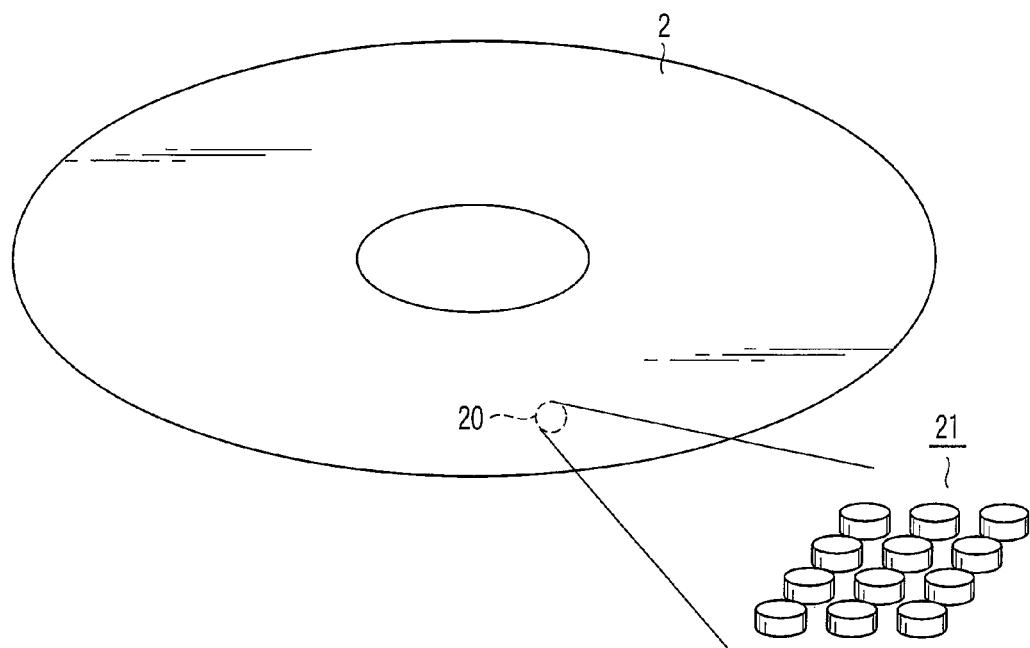
FIG. 3 is a diagram showing the structure of a disk according to the embodiment.

As FIG. 3 shows, the disk 2 according to the present embodiment has a data-recording area 20, which is constituted by a number of tiny magnetic dots 21 that have been artificially spaced apart from one another. The disk drive according to this embodiment records data consisting of many data bits (0s and 1s) on the disk 2, allocating each bit to one or more magnetic dots 21.

Figure 4:
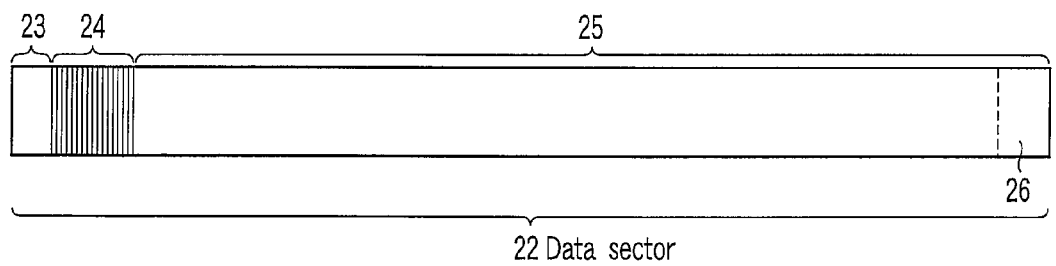
FIG. 4 is a diagram explaining the data sectors provided on the disk according to the embodiment.
Figure 8:
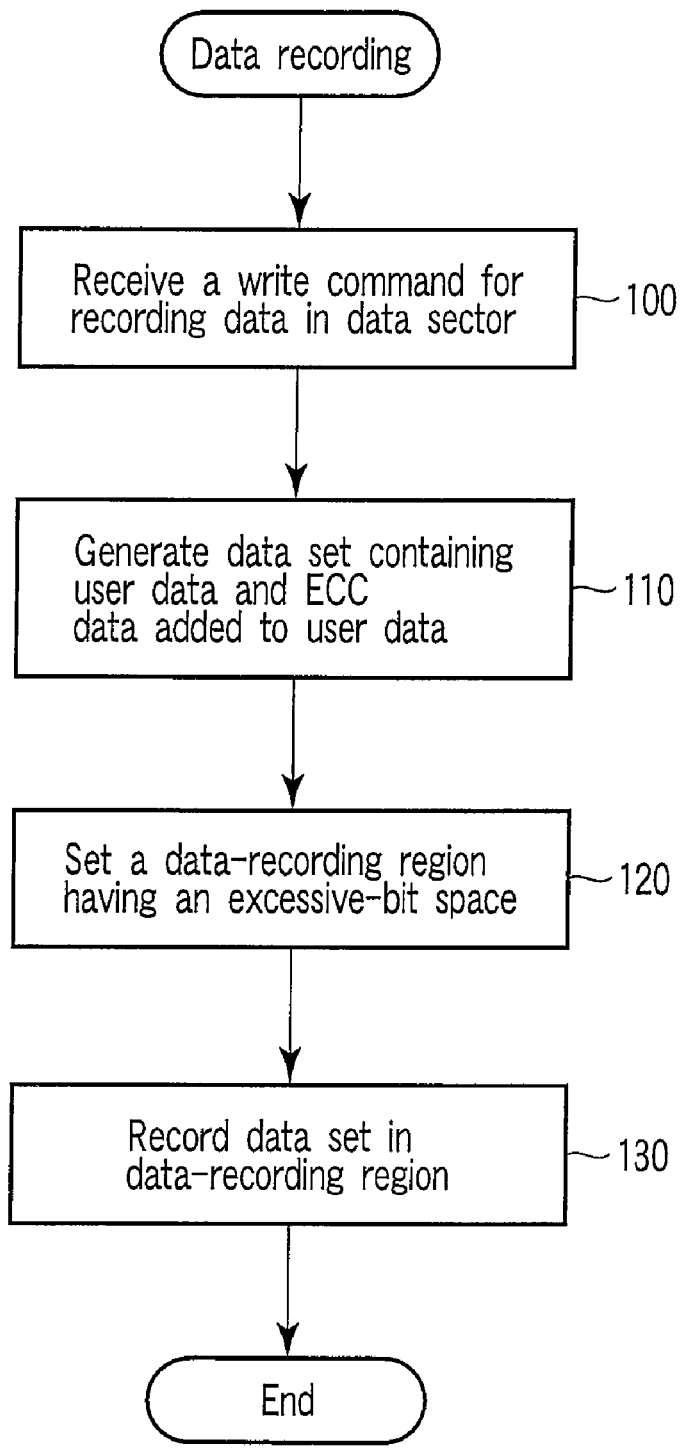
FIG. 8 is a flowchart explaining a data-recording process performed in the embodiment of FIG. 1.

In the disk drive, a number of tracks are formed on the disk 2. Each track is divided into data-access unit regions called data sectors 22. Each data sector 22 is a data unit having a predetermined length of, for example, 512 bytes. As shown in FIG. 4, the sector 22 has an address region 23, a sync region 24, and a data-recording region 25. The address region 23 is used to store the address representing the sector number. The sync region 24 is used to synchronize the interval and phase for recording/reproduction timing.

The data-recording region 25 is a region in which data (hereinafter referred, in some cases, to data set) may be recorded. This data is a combination of the user data transferred from the host system 15 and the error-correcting code (i.e., parity code in the embodiment). As shown in FIG. 3, the data-recording region 25 has a set of magnetic dots 21 (i.e., a magnetic-dot pattern).

The address region 23 and the sync region 24 may have magnetic-dot patterns, just like the data-recording region 25. Alternatively, the regions 23 and 24 may hold address signals and sync signals, which are magnetic signals, in continuous magnetic-film regions not processed yet.

(Data-Recording and Advantages Thereof)

The data-recording process and the data-reproducing process, both performed in the present embodiment, will be explained with reference to FIG. 5A to FIG. 11. First, the data-recording process will be described, with reference to FIGS. 5A to 7B and the flowchart of FIG. 11.

In the disk drive, the data-recording process is started when the disk controller 12 receives a write command from the host system 15 (Block 100). In the data-recording process, the CPU 13 drives and controls the actuator 5, moving the head 4 to the target track having that of the disk 2, which has the data sector that should be accessed. The head 4 is thereby positioned with respect to the disk. The disk controller 12 adds ECC data, or a parity code, to the user data transferred from the host system 15, thus generating a data set. The read/write channel 11 performs channel coding, converting the data set to a data bit string consisting of, for example, NRZI codes (Block 110). This data set will be supplied to the head amplifier 7.

The disk controller 12 sets the data-recording region 25 in the data sector 22 shown in FIG. 4 (Block 120). As FIG. 4 shows, the data-recording region 25 has a storage area 26 for holding excessive bits in the case where the recording interval changes as will be explained later.

Once the head 4 has been positioned over the track including the data sector 22 to access, the read element reads a sync signal from the sync region 24 included in the data sector 22. The sync signal contains signals repeated at the interval of the magnetic dots that constitute the magnetic-dot pattern in the recording region 25. The read/write channel 11 generates a clock signal from the waveform of the sync signal reproduced from the sync region 24. The clock signal thus generated will be used to record and reproduce the data set. The write element of the head 4 records the data set (a data-bit string of NRZI codes) in the recording region 25, at the timing of the clock signal reproduced (Block 130).

In the data-recording process described above, the recording magnetic field is repeated inverted as shown in FIGS. 5A and 5B in accordance with the positions of the magnetic dots, as long as the interval and phase of the clock signal generated from the sync signal read from the sync region 24 completely coincide with the interval and phase of the magnetic dots formed in the recording region 25. The magnetic-dot pattern corresponding to the data bits (0s and 1) to record is thereby recorded.

FIGS. 5A, 6A and 7A indicate how the recording magnetic field is repeatedly inverted in terms of direction. FIG. 5B shows data dots magnetized in accordance with the data bits (0s and 1s) that should be recorded. Any data dot magnetized in, for example, the downward direction corresponds to a data bit "1."

While the disk drive is actually used, the interval of the data dots may, in some cases, fluctuate because of various causes during the data-recording process. Among these causes are: a deviation of the data-dot interval from the prescribed value; a change in the rotational speed of the spindle motor 3, an eccentricity the discrete tracks of the disk 2 have with respect to the center of the disk 2.

Because of the causes given, the interval of the sync signals reproduced from the sync region 24 may differ from those of the magnetic dots formed in the recording region 25. In this case, such errors as shown in FIGS. 6B and 7B are made as will be explained on the assumption that 10-bit data is allocated to 10 magnetic dots.

Error state 50 shown in FIG. 6B has resulted from a deviation of the data-bit interval from the sync-signal interval. That is, two consecutive data dots 51 and 52 (for two bits) have formed, though only one data dot 51 (for one bit) should be formed. Consequently, the bits following the bit corresponding to data dot 51 are shifted backwards, each by a distance of one bit.

In other words, the positional relation between each dot and the position where the recording magnetic field is inverted will keep changing if the data-bit interval deviates from the sync-signal interval in the data-recording region 25. Nonetheless, in any BPM disk, each dot is always magnetized in one of two directions, i.e., upwards or downwards, depending on the intensity of the recording magnetic field. Hence, the direction in which each dot is actually magnetized is always identical to the direction that should be recorded in the magnetic dot, until the positional deviation of the dot from the position where the recording magnetic field is inverted exceeds a certain threshold value.

If this positional deviation increases over the threshold value, however, the dot can no longer undergo the magnetization inversion that accords with the recording magnetic field. Inevitably, the bit will be recorded at the next magnetic dot. Consequently, in the data-bit string that follows, the data bits are located backwards, each by a distance of one dot. As a result, the following error will be recorded, because of the shift of the recording timing, at the completion of the recording of the 10-bit data.

That is, 52 excessive data bits for one dot are included in the data if the error state of FIG. 6B develops. The data bits following these excessive data bits are inevitably recorded, each physically shifted back by one dot. Therefore, until the data is completely recorded, the total number of data dots actually recorded (i.e., the number of all data bits recorded) increases, from the proper 10 dots to 11 dots (i.e., 11 bits) including the excessive 52 dots.

The interval of data recording may be a little shorter than the actual interval of data dots. If this is the case, such an error as shown in FIG. 7B will develop. More precisely, one dot (i.e., one bit) 53 of the recorded data is lost. In other words, the dot 53 directed downwards does not remain, whereby the position of the data following this dot 53 physically shifts forwards by a distance of one dot. Hence, the total number of data dots actually recorded (i.e., number of all data bits recorded) decreases by one, that is, from 10 dots to 9 dots (9 bits).

Thus, the disk drive according to the embodiment has the function of correcting a data error that develops if the interval of the dots formed in the data-recording region 25 deviates from the data-recording interval as described above. That is, the disk drive first infers the original data-bit string (data set) to record and then corrects the data error.

Figure 9:
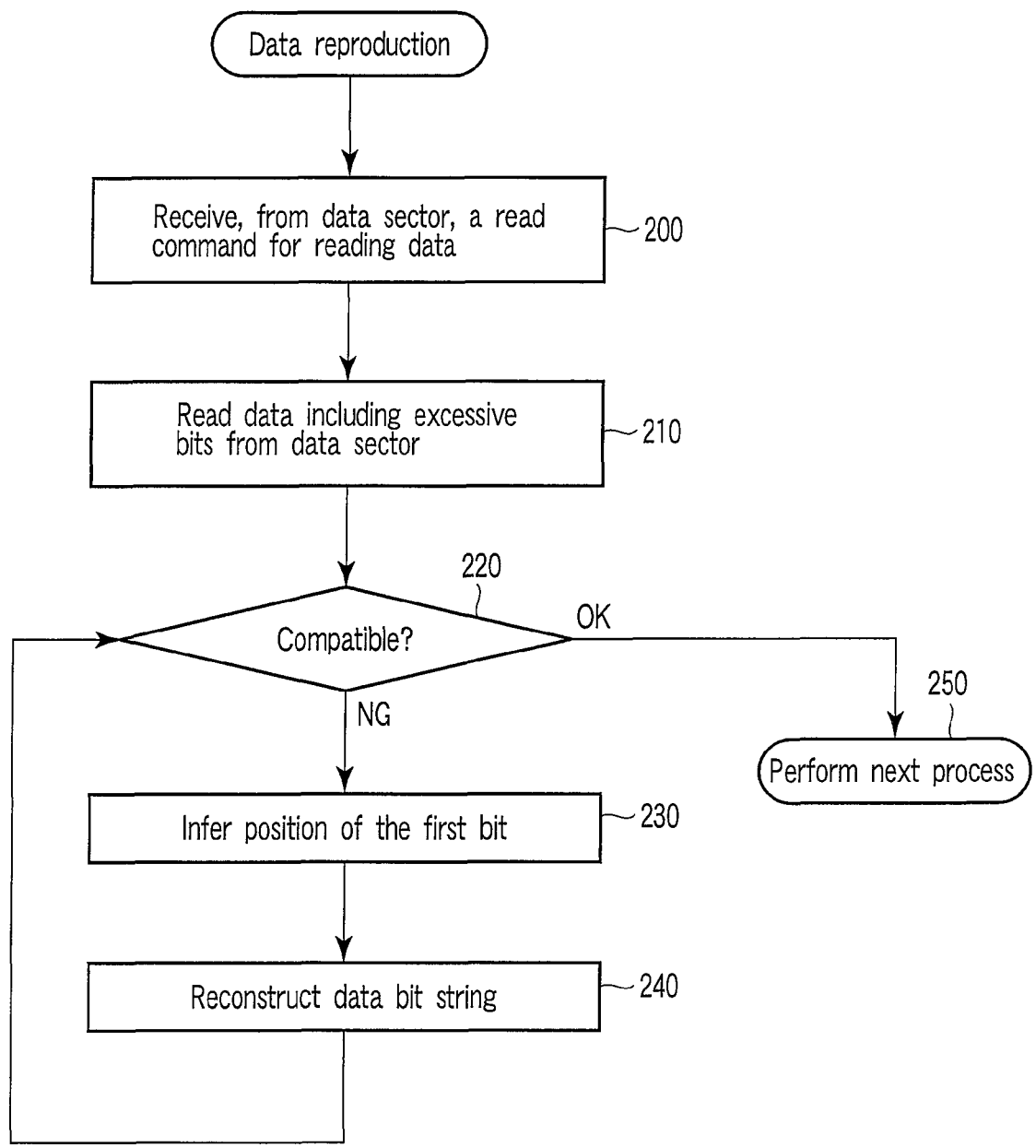
FIG. 9 is a flowchart explaining a data-reproducing process performed in the present embodiment.

The method of correcting data errors that have developed during the data-reproducing process, which the disk drive according to the embodiment, will be explained in detail, with reference to the flowchart of FIG. 9 and to FIGS. 10A and 10B, and FIG. 11.

As already pointed out, the total number of data dots recorded fluctuates if an error made in recording timing. Consequently, the total number of bits constituting the data steam reproduced differs from the total number of bits constituting the recorded data, either larger or smaller than the number of bits that constituting the data that should be recorded. Further, the data-bit string that follows the threshold time point of recording the data, either preceding or following the data by a distance of one bit.

Thus, the disk drive first infers a recording-timing error and then restores the original data-bit string (data set) that should be recorded in the data-error correcting method according to this embodiment.

In the embodiment, the storage area 26 for holding excessive bits corresponding excessive dots is provided in the terminating part of the data-recording region 25 as shown in FIG. 4, on the assumption that the total number of data bits would fluctuate during the above-described data-recording process. (Refer to Block 120 shown in FIG. 8.)

In the data-recording process, a data set consisting of, for example, non-return-to-zero inverted (NRZI) codes is recorded in the data-recording region 25. This encoded data is a data-bit string constituted by 0s and 1s, each 0 corresponding to a dot magnetized in the same phase as the adjacent dot, and each 1 corresponding to a dot magnetized in the phase opposite to that of the adjacent dot.

The data set contains error-correcting codes (ECCs), for example, parity codes, which are to be added to the user data. More specifically, the ECCs are two-dimensional parity codes as illustrated in FIG. 11. That is, the original data set has been replaced by a square matrix [dnm], and parity codes [Pn0] and [P0m] are generated for each row and each column of the square matrix, respectively, thereby checking the contents of the square matrix. The rule of generating the parity codes is to, for example, find the sum of product of data items of the row or column.

A data-reproducing process including the error-correcting process according to this embodiment will be explained with reference to the flowchart of FIG. 9.

The data-reproducing process is initiated when the disk controller 12 receives a read command from the host system 15, (Block 200). In the data-reproducing process, the CPU 13 drives and controls the actuator 5. Thus driven, the actuator 5 moves the head 4 to the target position over the disk 2. The head 4 is thereby positioned at the target sector having the data sector that should be accessed.

The head 4 reads a read signal from the data sector. From the read signal, the read/write channel 11 reproduces the recorded data (i.e., data-bit string consisting of NRZI codes, in this instance). The data thus reproduced is output to the disk controller 12. From the read/write channel 11, the disk controller 12 acquires, as a reproduction access unit, all data recorded in the data-recording region 25 of the data sector 22 (, i.e., the data set and the excessive bits 26) (Block 210).

The disk controller 12 determines whether the data set is compatible, by using the parity codes arranged in the data set reproduced (Block 220). The data set is "compatible," if all coded data-bit string {dnm} and all parity codes, which constitute the data set reproduced, accord with the data-reproducing rule applied. Hence, the total number of bits of the data set is equal to the total number of data-bit string that should be recorded.

If the data set is compatible, no recording-timing errors have developed. Therefore, the disk controller 12 performs, on the data set reproduced, the ordinary ECC process using parity codes, namely the correction of the errors developed at specific bit locations (Block 250, if OK in Block 220). Then, the disk controller 12 transfers the ECC-processed data to the host system 15.

The data set may not be compatible. In this case, an recording-timing error has developed. That is, at least one coded data-bit string {dnm} is not compatible with the associate parity code in the data set. In this case, the disk controller 12 infers the position where the first excessive data dot has been added when a recording-timing error is made, or where the first data dot has been lost (Block 230, if NG in Block 220).

Figure 10A:
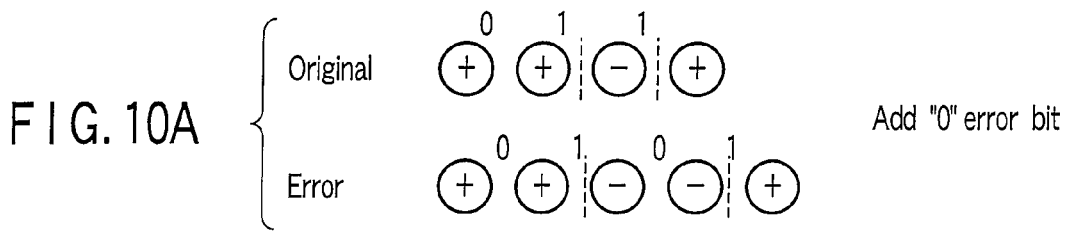
FIGS. 10A and 10B are diagrams illustrating an error pattern that may be formed in the embodiment of FIG. 1.
Figure 10B:
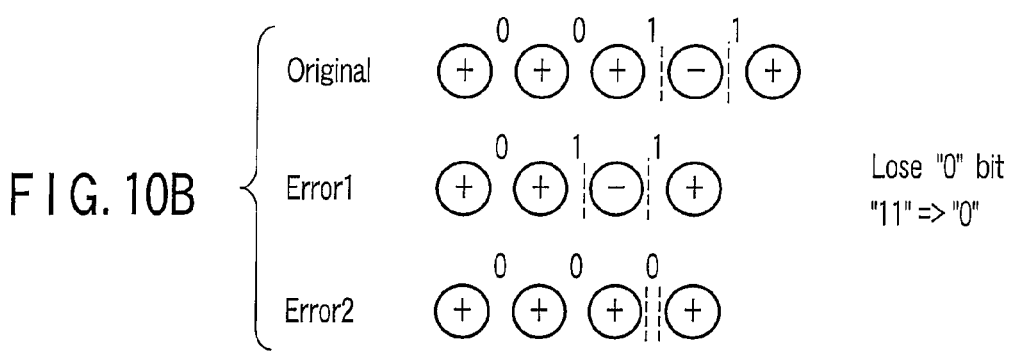

FIGS. 10A and 10B are diagrams illustrating an error pattern that may be formed when a recording-timing error (phase shift) develops.

FIG. 10A shows a pattern called "spread," which is an error pattern that develops when the timing of inverting the recording magnetic field is shifted backwards by a distance of one dot from a certain threshold position. In the error pattern, a data-bit string (Error) differs from the original data-bit string in that it contains an additional 0 at the position that lies one dot behind the threshold position. In this case, the excessive bits recorded by mistake are exclusively 0, never being 1.

FIG. 10B shows a pattern called "shrink," which is an error pattern that develops when the timing of inverting the recording magnetic field is shifted forwards by a distance of one dot from a certain threshold position. In the error pattern, a data-bit string (Error 1) differs from the original data-bit string in that it has lost one 0 at the position that lies one dot before the threshold position. In rare cases, where the timing is shifted over two bits, original two-bit data "11" may change to one-bit data "0" (Error 2).

Nonetheless, error patterns formed when NRZI codes are applied can be classified into three types. Hence, three types of data sets can be reproduced by inferring the positions of three error patterns from parity codes or the like. One of the three types of data sets, which is the most compatible with the associate parity code can be confirmed as the original recorded data.

Figure 11:
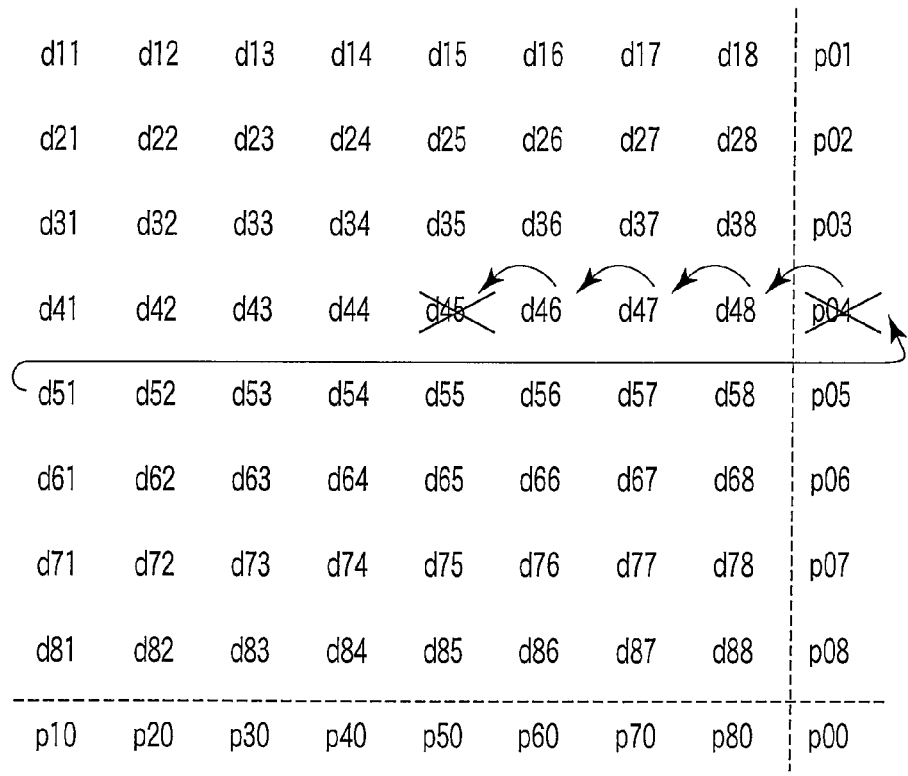
FIG. 11 is a diagram showing a data set related to the embodiment of FIG. 1.

As FIG. 11 shows, a recording-timing error may develop at, for example, data bit {d45} in a given data set. If this is the case, the data bits following the data bit {d45} shift in position, each by a distance of one bit. As a result, the compatibility that the data bits following the bit {d45} has with the associate parity code is completely destroyed. Thus, from the parity code with which the data bit {d45} is compatible, the disk controller 12 infers the data bit {d45} as the first of the bits that constitute a 4-row, 5-column matrix.

If the data at the data bit {d45} is 0, the controller 12 deletes the data bit {d45} and shifts the following data-bit string forwards as indicated by arrows in FIG. 11, thereby reconstructing the entire data-bit string (Block 240). In this case, one data bit must be added to the end of the data-bit string. The disk controller 12 only needs to add the first of the excessive bits (i.e., excessive bits 26) to the end of the data-bit string. In this regard it should be noted that the excessive bits have been reproduced and included in the total number of data bits.

The data-bit string of the data set may be reconstructed in a different manner. For example, the data-bit string may be reconstructed by first adding 0 at the position the data bit {d45} initially took and then shifting the following data bits backwards by a distance of one bit. Alternatively, if the data at the data bit {d45} is 0, it may be converted to "11" and the data bits following the bit {d45} may be shifted backwards by a distance of one bit.

The data set reconstructed may assume a different pattern, in which 0 is added at the position of the data bit {d45} and the following data bits are shifted backwards by a distance of one dot. If the data at the data bit {d45} is 9, the data-bit string reconstructed may take still another pattern, in which said data has been converted to data "11" and the following data bits have been shifted backwards by a distance of one dot.

In short, the disk controller 12 adds one bit assumed to have initially existed, at that position of the data set, where an data error is inferred to have developed, or deletes one bit assumed to have been added in excess. The disk controller 12 then reconstructs the entire data-bit string, in which the bit-string following the data error has been added, each shifted by a distance of one bit, or from which this bit-string has been deleted.

If the data codes are compatible, as described above, with the associated parity codes in the data set reconstructed (if OK in Block 220), the disk controller 12 determines that the data-bit string reconstructed is data that has been corrected. Of the three types of error patterns, described above, the pattern most compatible is determined to be the corrected pattern. The data codes may become incompatible with the associated parity codes after the data-bit string has been reconstructed. In this case (if NG in Block 220), the above-mentioned process of reconstructing the data-bit string of the data set is performed again.

It has been explained how the error-correcting process is performed in the embodiment to correct the data errors resulting from the recording-timing error for only one dot. The data errors can be corrected by different methods. If a recording-timing error develops for a plurality of dots, Blocks 220 to 240 are repeated until the data-bit string of the data set becomes compatible in its entirely. Thus, a correct data set can be ultimately reconstructed.

As has been described, the disk drive according to the embodiment can effectively correct any data item in which the total number of data bits has changed during its reproduction. More precisely, the disk drive has a disk controller 12, which performs an effective correction on any erroneous pattern in which the total number of data bits has changed because of a recording-timing error developing in the process of reproducing data from a BPM disk. That is, the disk controller 12 maintains the data recorded in the data sector in which the total number of data bits has erroneously changed, then detects or infers the error pattern and corrects (or reconstructs) the data set. Therefore, the disk drive can accomplish a data reproduction at high reliability.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
   a disk having a data-recording area for recording a data set which comprises a preset number of bits and which contains user data to which error-correcting codes have been added;
   a data-reproducing unit having a head and configured to record the data set in the data-recording area and to reproduce the data set from the data-recording area;
   an error-determining unit configured to determine, by using the error-correcting codes, an error showing a change in the total number of bits in a data-bit string of the data set reproduced by the data-reproducing unit; and
   an error-correcting unit configured to detect data bits lost in the data set or excessive data bits added to the data set and to correct an error in the data-bit string in accordance with the data bits detected.

2. The disk drive according to claim 1, wherein the error-correcting unit detects the positions of the data bits lost or excessive data bits added, and adds new data bits to the data set or removes data bits from the data set, in accordance with the data bits detected, thereby reconstructing a data-bit string of a data set that is compatible with the error-correcting codes.

3. The disk drive according to claim 1, wherein the error-determining unit determines whether the data set is compatible with the error-correcting codes, on the basis of the relation between the user data and the error-correcting codes, and detects an error pattern showing a change in the total number of bits, on the basis of the data bits not compatible with the error-correcting codes.

4. The disk drive according to claim 2, wherein the error-determining unit determines whether the data set is compatible with the error-correcting codes, on the basis of the relation between the user data and the error-correcting codes, and detects an error pattern showing a change in the total number of bits, on the basis of the data bits not compatible with the error-correcting codes.

5. The disk drive according to claim 1, wherein the data set includes parity codes as the error-correcting code and two-dimensional parity codes added to the user data.

6. The disk drive according to claim 1, wherein the data-recording area is an area for recording the user data comprising a number of data bits, which constitute an access unit, and the error-correcting codes and the excessive data bits are added to the access unit.

7. The disk drive according to claim 1, wherein the disk is a magnetic recording medium having a data-recording area constituted by a set of magnetic dots which are physically separated from one another, and the data-reproducing unit is configured to magnetically record the magnetic dots as data dots, in accordance with a magnetization direction of a recording magnetic field applied from the head, thereby recording the data set in the data-recording area.

8. The disk drive according to claim 1, wherein the disk is a magnetic recording medium having a data-recording area constituted by a set of magnetic dots which are physically separated from one another, and the data-recording area includes a sync-signal recording region in which sync signals determining the timing of recording the data set are recorded.

9. A method of correcting data errors in a disk drive that includes a disk having a data-recording area for recording a data set which comprises a preset number of bits and which contains user data to which error-correcting codes have been added, and a data-reproducing unit having a head and configured to record the data set in the data-recording area and to reproduce the data set from the data-recording area, the method comprising:

determining, by using the error-correcting codes, an error showing a change in the total number of bits in a data-bit string of the data set reproduced by the data-reproducing unit; and detecting data bits lost in the data set or excessive data bits added to the data set and correcting an error in the data-bit string of the data set in accordance with the data bits detected.

10. The method according to claim 9, wherein the correcting of an error is to detect the positions of the data bits lost or excessive data bits added, and to add new data bits to the data-bit string of the data set or remove data bits from the data-bit string of the data set, in accordance with the data bits detected, thereby reconstructing a data-bit string of a data set that is compatible with the error-correcting codes.

11. The method according to claim 9, wherein the determining of an error is to determine whether the data set is compatible with the error-correcting codes, on the basis of the relation between the user data and the error-correcting codes, and to detect an error pattern showing a change in the total number of bits, on the basis of the data bits not compatible with the error-correcting codes.

12. The method according to claim 10, wherein the determining of an error is to determine whether the data set is compatible with the error-correcting codes, on the basis of the relation between the user data and the error-correcting codes, and to detect an error pattern showing a change in the total number of bits, on the basis of the data bits not compatible with the error-correcting codes.

13. A method of correcting data errors in a disk drive that includes a disk having a data-recording area constituted by a set of magnetic dots which are physically separated from one another, and a data-reproducing unit having a head and configured to record the data set in the data-recording area and to reproduce the data set from the data-recording area, the method comprising:

determining, by using the error-correcting codes, an error showing a change in the total number of bits in a data-bit string of the data set reproduced by the data-reproducing unit; and detecting data bits lost in the data-bit string of the data set or excessive data bits added to the data-bit string of the data set and correcting an error in the data set in accordance with the data bits detected.

* * * * *